March 23, 1971     P. E. CAVANAGH     3,572,291

METHOD AND APPARATUS FOR GROWING FISH

Filed Feb. 24, 1969     4 Sheets-Sheet 1

INVENTOR
*PATRICK E. CAVANAGH*

BY *Cavanagh & Norman*

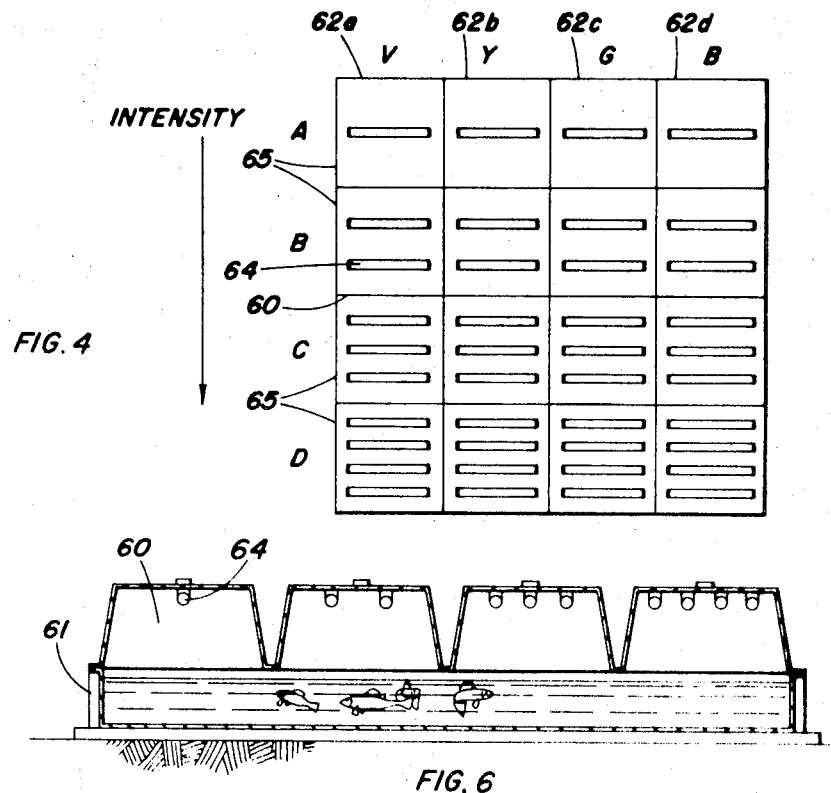
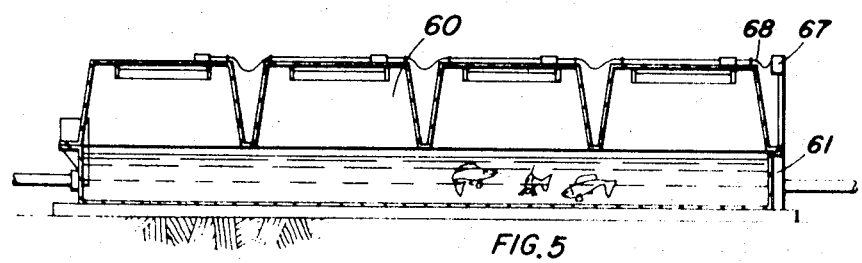
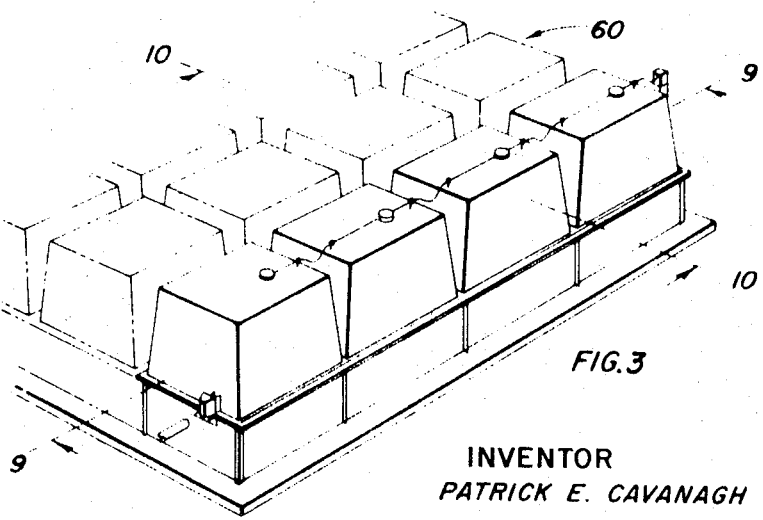

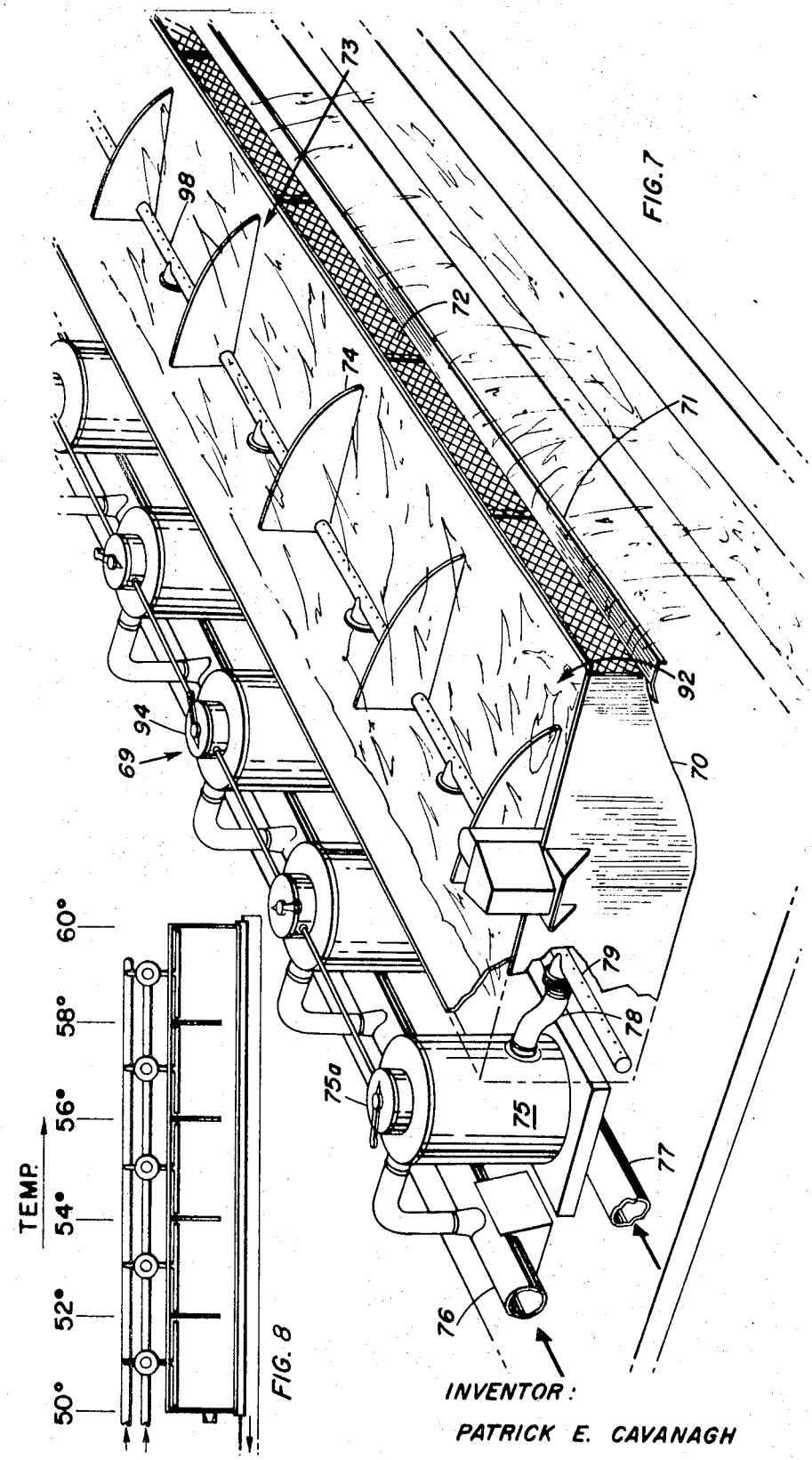

United States Patent Office 3,572,291
Patented Mar. 23, 1971

1

3,572,291
METHOD AND APPARATUS FOR GROWING FISH
Patrick Edgar Cavanagh, Toronto, Ontario, Canada, assignor to Premium Iron Ores Limited, Toronto-Dominion-Dominion Centre, Toronto, Ontario, Canada
Filed Feb. 24, 1969, Ser. No. 801,505
Claims priority, application Canada, Dec. 16, 1968, 37,983
Int. Cl. A01k 61/00
U.S. Cl. 119—3
9 Claims

ABSTRACT OF THE DISCLOSURE

The following specification discloses a fish selected environmental control for growing fish to increase the rate of growth. Fish are moved there in production stage and subjected to a range of environmental values of which they are observed to select the optimum. The particular production stage is then adjusted in its environment to correspond.

---

This invention relates to a method and apparatus for growing fish in a manner selectable by the fish to achieve a maximum growth rate.

In the growing or raising of marketable fish on a commercial scale it is usual to provide prepared pens or tanks in which the fish are raised under more or less controlled conditions. It is known that by providing temperature and feed control, the rate of fish growth and thus the time in which marketable fish are produced can be controlled. Trial and error on the part of the operator is the method employed in applying control as to salinity, temperature and feed according to the prior art. While under accidental conditions of fortunate choice a satisfactory environment may be achieved to a considerable degree for a period of growth the necessary exercise of caution in applying operator determined environmental control leads to conservatism limiting prolonged growth at high or maximum rates, the latter being substantially unknown heretofore.

It is the main object of this invention to grow fish at a maximum rate.

It is a further object of the invention to grow fish in an environment selected by the fish at a maximum rate.

It is another object of the invention to provide a system and method for growing fish at a maximum rate in which the fish at any stage of growth are subjected to range of one or more environment conditions and observed by the operator as to the selection of specific value of the condition or conditions by the fish and then the environment of the fish at said stage is controlled accordingly to achieve maximum growth.

It is another object of the invention to control the growth and scheduling of growth of fish at a maximum rate to supply a uniform output of fish from a fish farm at all seasons of the calendar year.

With the foregoing and other objects in view the invention generally concerns a method of growing fish of the genus trout in a series of growth production stages by separating some of the fish from any production stage and subjecting said separated fish to a range of an environment condition while observing the selection by the fish of the specific value of the environment condition; then correcting or controlling the particular environment condition to said value in said production stage.

The invention also embodies a system and apparatus for achieving the foregoing.

Other objects and features of the invention will be apparent from the following detailed description and accompanying drawings in which like numerals refer to like parts thereof throughout the various views and diagrams, and in which:

FIG. 3 is a perspective view of a light determining apparatus suitable for use with the present invention;

FIG. 4 is a plan view of the device as illustrated in FIG. 3;

FIG. 5 is a section along the line 5—5 in FIG. 3;

FIG. 6 is a section along the line 6—6 of FIG. 3;

FIG. 7 is a perspective view of a portion of a temperature determining apparatus suitable for use with the present invention; and FIG. 8 is a plan view of the apparatus as illustrated in FIG. 7.

Figure 1:
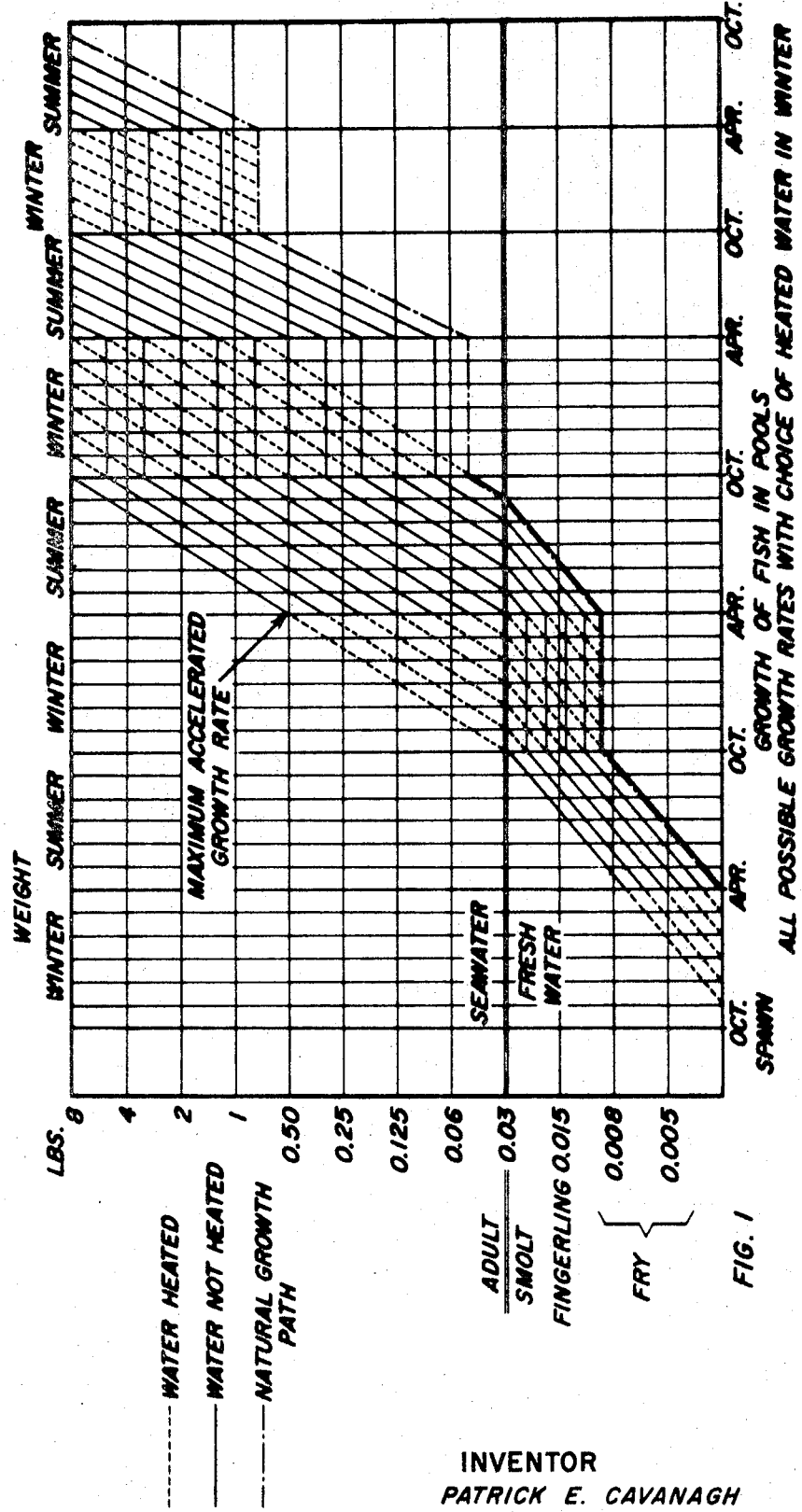
FIG. 1 is a diagrammatic view illustrating in composite forms the possible paths of accelerated growth for fish which may be utilized through the various seasons leading up to a marketable weight.

With reference to FIG. 1 the general method of the invention is illustrated by means of the graph. The plotted lines on the graph represent the paths or the courses the fish are passed through in raising same from the egg stage up to the marketable weight. In this figure, 11 possible paths by which the fish may reach maturity are shown for comparison purposes. The solid lines represent growing of the fish in natural state. The broken lines represent portions of the growing paths in which additional heat is added to bring the water temperature up to the optimum growing temperature. In this specification "adult" means conditioned to sea water, "smolt" means a condition of the fish, "fry" means a fish size and condition after haching and less than fingerling.

Figure 2:
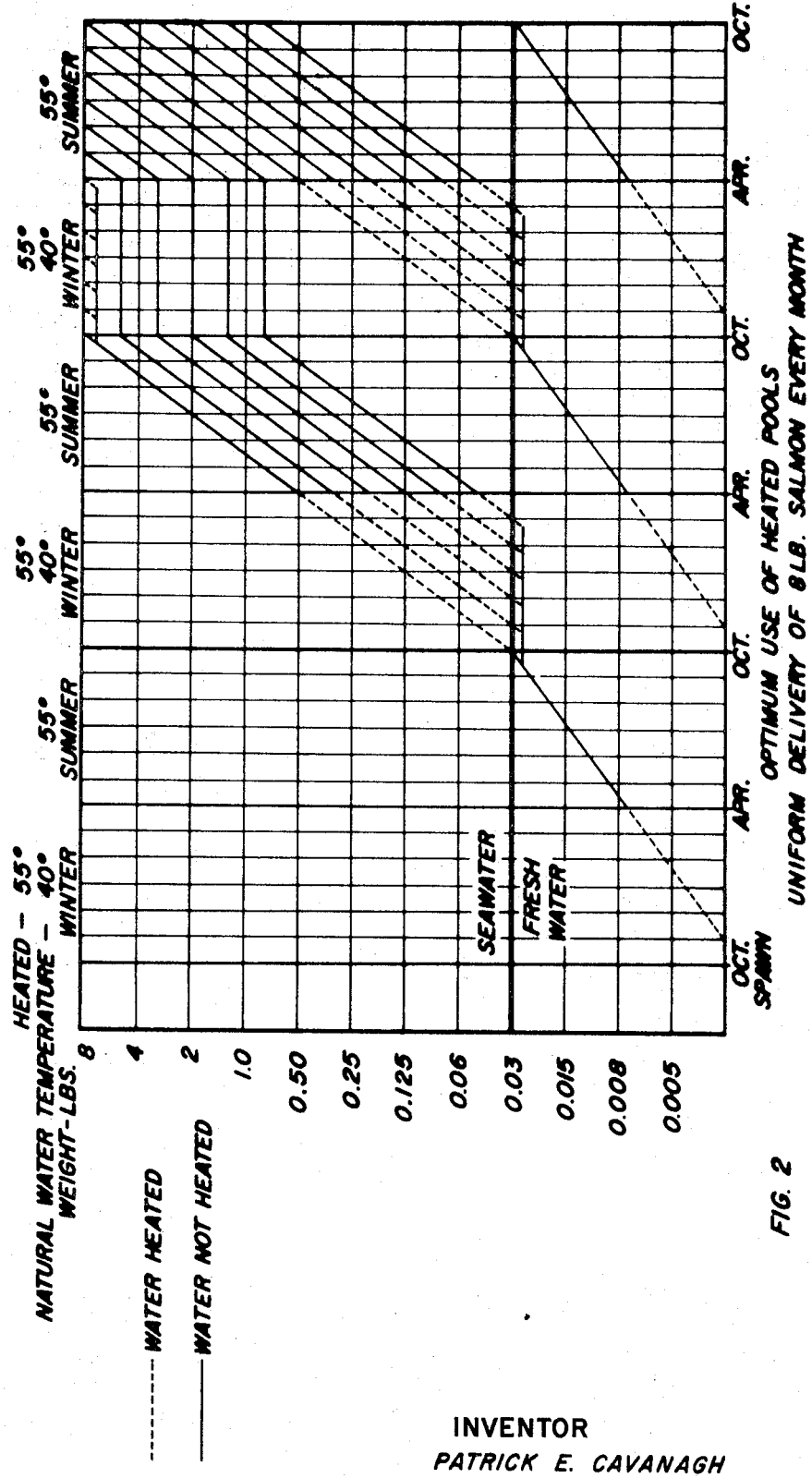
FIG. 2 is a diagram illustrating a preferred method of providing fish of uniform size and supply according to the present invention.

With reference to FIG. 2 a similar graph is shown and the lines plotted on this graph illustrate the optimum growing path that it would be desirable for a unit of fish to travel to obtain marketable fish at predetermined intervals and at predetermined weights. This graph illustrates such a path for salmon fish which are spawned in late September or October and grown according to the plotted lines to produce a year's supply of fish delivered in monthly batches, the weights and numbers of the fish being approximately constant.

Referring to FIGS. 3 to 6 inclusive a light conditioning control apparatus is illustrated and indicated generally as 60. It is intended that the apparatus 60 be installed over a tank unit 61 in order that fish within the tank can be subjected to artificial light of various intensities and colours. To this end the unit is divided into a number of individual light units 62a (violet), 62b (yellow), 62c (green), 62d (blue), each provided with a light source 63 being different in intensity in zones A, B, C, D by increasing number of lighting units 64 in each zone 65 from A to D.

Control fish are placed within the tank 61 and the fish as at 66 select the environmental conditions of light most suitable for their stage of growth and metabolism. Means such as the controllers 67 supplied through cables 68 from the electrical supply can be used to control the overall intensity of the range of individual light zones or units 65.

With reference to FIG. 7 and FIG. 8 apparatus for determining optimum temperature conditions for fish culture is illustrated and indicated generally as 69. The apparatus comprises a tank 70 provided with a weir portion 71 preferably screened with the screening strip 72 to prevent fish within the tank 70 from jumping out. The tank 70 is divided into a plurality of compartments 73 by means of the baffles 74 whereby a cross flow in the tank is maintained.

Only one group of fish is introduced and the fish choose the temperature that they prefer. The location of the fish along the length of the tank 70 indicates the preferable temperature for fish at this stage of growth. Once the temperature has been found from this, the temperature of the main production tanks can be controlled to a similar range. Alternatively, a sonar unit located at one end of the tank can indicate the distance from the end of the tank to the location of the fish and thus this can be converted into temperature signal to automatically control the temperature in the production tanks.

As a means for providing controlled temperature water to the individual compartments 73 a plurality of blending units 75 are supplied from a hot-water line 76 and a cold-water line 77. The units 75 blend the hot and cold water to the predetermined temperature selected by a conventional thermostatic valve 75a and supply this modified tempertaure water by means of the pipes 78 in a header assembly 79. In this manner by suitably varying the setting for the individual controllers 75 variations in temperature between the baffles 74 can be obtained. Upon fish being introduced into the tank 70 they will gather in the temperature range most desirable and thus the temperature required for optimum growing conditions within the main growing tanks can be ascertained.

From the foregoing it will be seen that the present invention provides a method of controlling the growth rate of fish whereby a continual supply of fish is obtained, the fish being continuously supplied for a whole twelve month period and being brought up to acceptable market weight throughout the period. As shown in FIG. 1 various growth paths are available from which a growth path can be selected for providing fish of required marketable weight in quantities as required. As has been previously stated a typical growth path is shown in FIG. 2 where a number of fish are hatched to provide twelve units, the units corresponding to a year's delivery. These fish are grown to the smolt stage, which is approximately .03 pound, after which the units are divided into separate paths as shown. The first seven units are provided with increased temperature to provide accelerated growth, and the remaining five units are held over for a period of one month's separation whereafter these also are provided with accelerated growth to provide the remainder of the delivery of fish units on a monthly delivery schedule.

Under normal conditions of growth salmon will smolt two years or later after hatching. The present system and method enables the smolt stage to be achieved within one year whereupon they may be introduced directly to cold sea water. Thus according to this invention heat is added to increase the rate of fish growth of those fish only which are less than a predetermined size. It is especially advantageous to add heat as required up to the smolt stage since the efficiency of heat addition relative to rate of growth is much greater when applied to small fish for a given size of production pool or tank, Thus, while the method according to the present invention provides marketable fish in discrete quantities and continuously on a year to year basis, the amount of heat required to maintain accelerated growth is kept to a low figure, thus, to reduce the total cost of the fish produced.

As will be evident from the foregoing the invention enables the improved growing of fish in an environmental manner which may be regarded as selected by the fish having regard to the practical application of the environmental conditions dictated by the fish and their application to temperature and light conditions during fish growth.

What I claim is:

1. In the method of growing fish of the genus trout to a desired weight in a series of production stages, the steps comprising: separating some of the fish from any production stage; establishing a control environment condition of a range of values; subjecting the separated fish to the control environment condition; observing the selection of a specific value of the environment condition by the separated fish; and applying said selected value of said environment condition to the environment of the fish in said production stage.

2. The method of claim 1 and controlling all production stages in at least one environment condition determined by fish separation and fish selection from each stage.

3. The method of claim 1 in which temperature, light intensity, and colour of light are selected by the fish from each production stage and are applied to the values selected by the fish to each stage.

4. The method according to claim 1 and the step of providing a varied environment of light by establishing a separate water pool for the separated fish and lighting the pool in varied intensity and colour whereby the separated fish in said stream may select the light intensity and colour most suitable.

5. The method according to claim 1 and the step of providing a varied environment by establishing a water stream and introducing the separated fish thereinto; controlling the temperature of said stream whereby the same is of predetermined temperature gradient through a selected distance within said stream and observing the temperature selected by the separated fish therein; and controlling the temperature environment of the said stage of growth of the fish being grown.

6. In a method for the growing of fish in tanks, the step of introducing some of the fish from a tank to a range of environmental conditions separate from said tanks, observing the fish's specific selection of separate environmental conditions; and changing the environmental conditions of said tank to conform to said specific selection by the fish whereby the fish effectively control conditions within said system by said separate selection of preferred conditions within said range.

7. In apparatus for growing fish of the genus trout, including an enclosed moving body of water: an enclosed loop water circuit for said enclosed body including a pump and a filter and a separate water source for introducing fresh water thereto; an environmental control device in the form of a separate enclosed moving water body and means establishing an environmental gradient through said separate body responsive to grouping of fish therein to reveal the conditioned environment selected by the fish; and means associated with said enclosed body for applying the fish selected environment conditions thereto.

8. Apparatus for rearing fish comprising: a temperature modified building structure; a supply tank having associated therewith piping connected to a source of water; a plurality of rearing tanks, at least one of which is located within said building structure; water tempering means including heating and cooling means operatively associated with said supply tank and said rearing tank within said building; waste discharge piping operatively connected to said rearing tanks; conditioning means operatively connected to said rearing tanks; and environmental control determining means associated with said rearing tanks selectively to control said conditioning means responsive to requirements selected by the fish.

9. Apparatus for rearing fish comprising: a water supply tank; water tempering means operatively associated with said supply tank; a plurality of rearing tanks; piping means interconnecting said supply tank and said rearing tanks; water purification means; piping means interconnecting said purification means with said rearing tanks; conditioning means operatively connected to said rearing tanks; and environment control determining means associated with said rearing tanks selectively to control said conditioning means responsive to requirements selected by the fish.

References Cited

UNITED STATES PATENTS

| | | | |
|---|---|---|---|
| 2,944,513 | 7/1960 | Keely | 119—3 |
| 3,116,712 | 1/1964 | Ogden et al. | 119—3 |
| 3,122,126 | 2/1964 | Yamada | 119—3 |
| 3,139,402 | 6/1964 | Armbrust | 119—3X |
| 3,155,609 | 11/1964 | Pampel | 119—3X |
| 3,158,135 | 11/1964 | Kimmerle | 119—3 |
| 3,166,043 | 1/1965 | Castillo | 119—3 |
| 3,446,185 | 5/1969 | Cavanagh | 119—3 |

ALDRICH F. MEDBERY, Primary Examiner

U.S. Cl. X.R.

119—2, 5